H. C. LORD.
TARGET TRAP.
APPLICATION FILED DEC. 31, 1909.
1,074,725.
Patented Oct. 7, 1913.
5 SHEETS—SHEET 1.
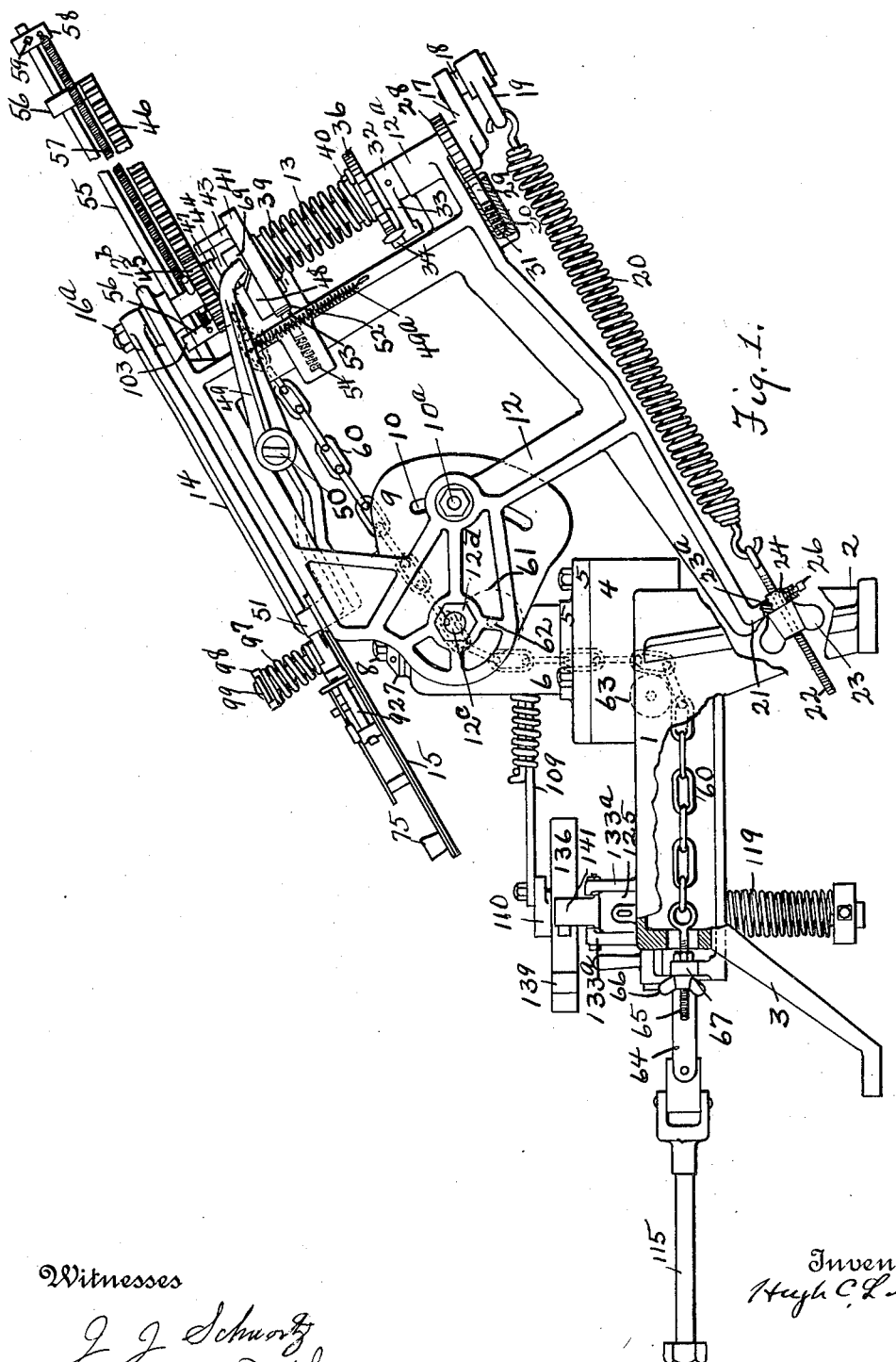
Witnesses
J. J. Schwartz
Margaret Beigle
Inventor
Hugh C. Lord

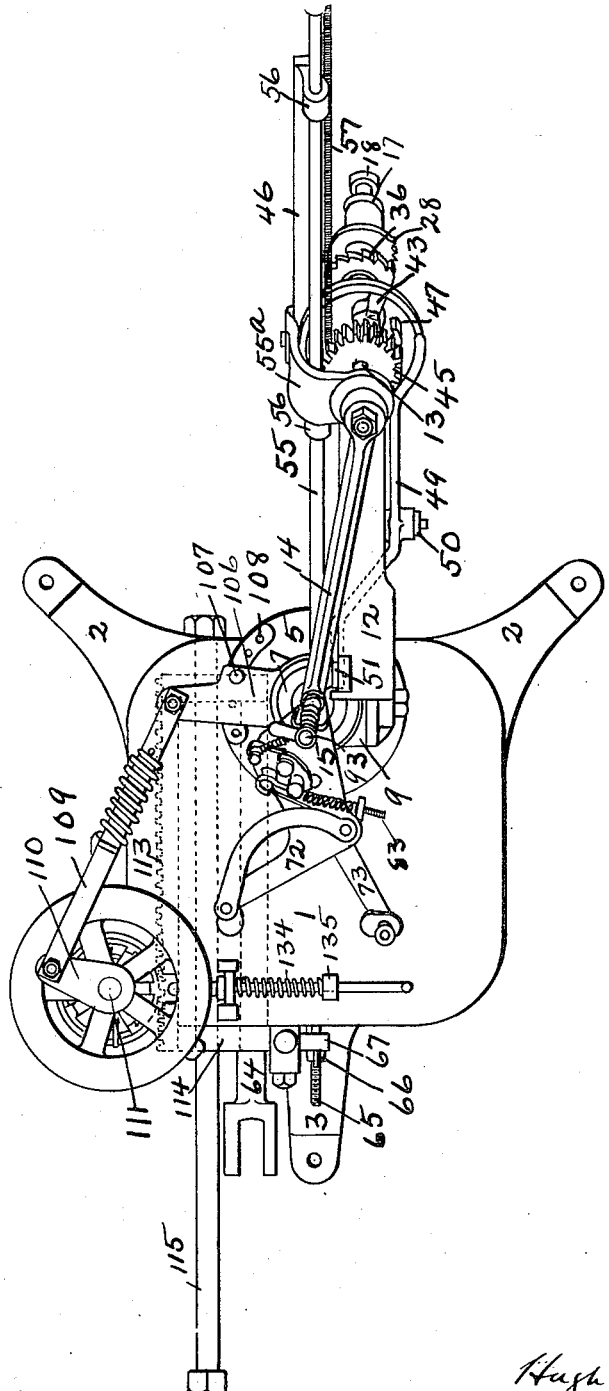

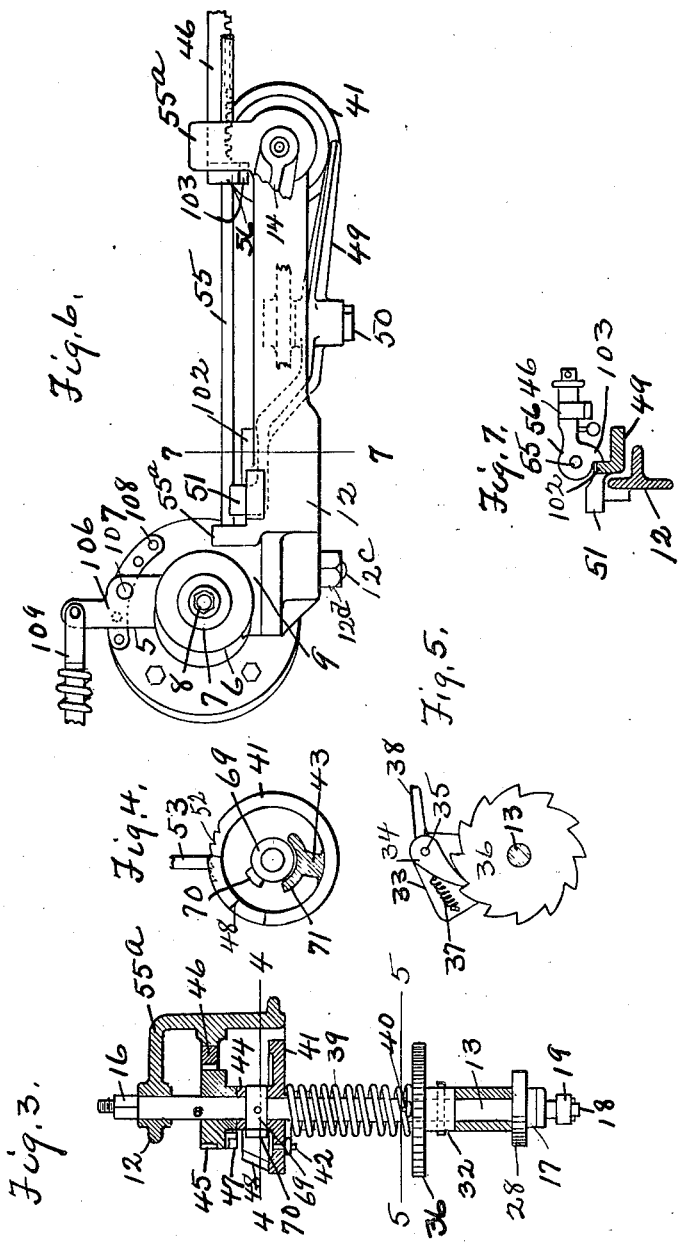

H. C. LORD.
TARGET TRAP.
APPLICATION FILED DEC. 31, 1909.
1,074,725.
Patented Oct. 7, 1913.
5 SHEETS—SHEET 4.
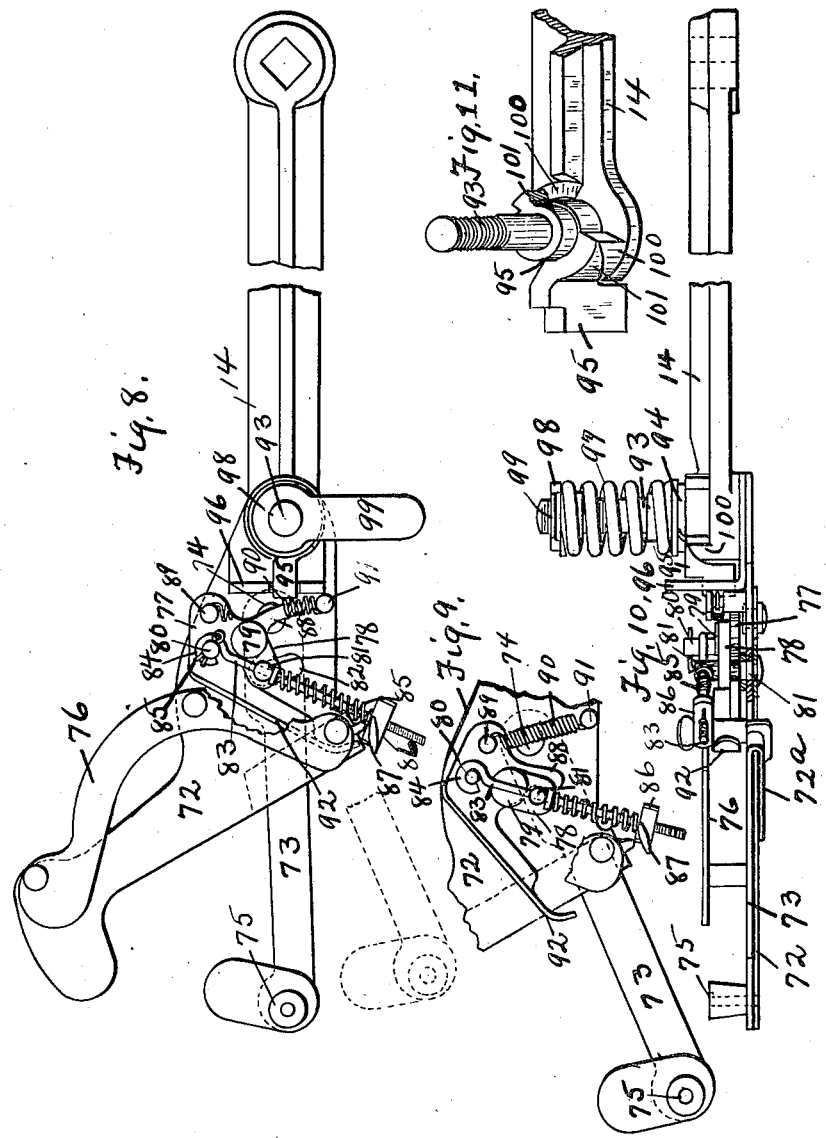
Witnesses
E. J. Schwartz
Margaret Beigle
Inventor
Hugh C. Lord

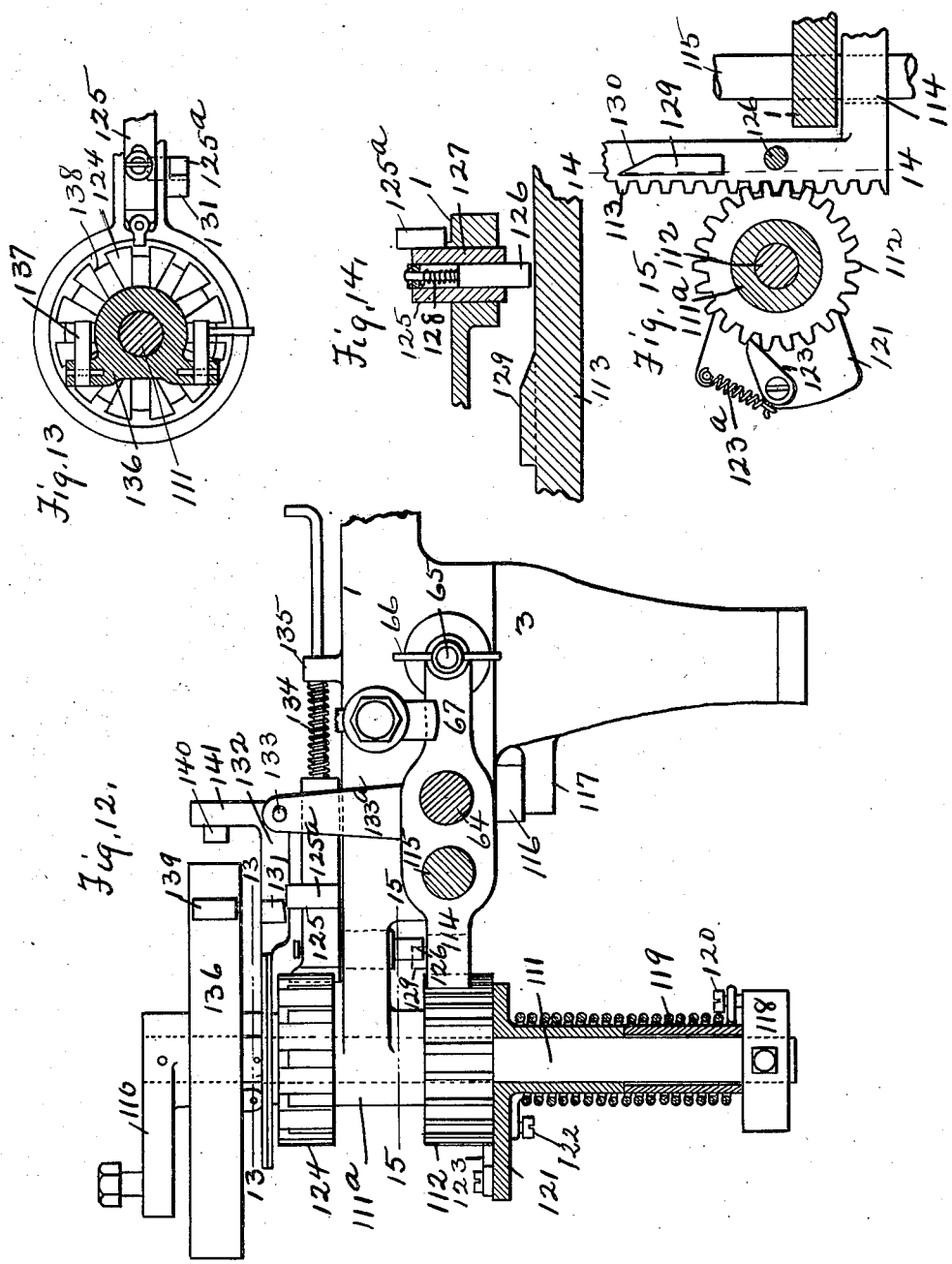

UNITED STATES PATENT OFFICE.

HUGH C. LORD, OF ERIE, PENNSYLVANIA.

TARGET-TRAP.

1,074,725.  Specification of Letters Patent.  Patented Oct. 7, 1913.

Application filed December 31, 1909. Serial No. 535,746.

*To all whom it may concern:*

Be it known that I, HUGH C. LORD, a citizen of the United States, residing at Erie, in the county of Erie and State of Pennsylvania, have invented new and useful Improvements in Target-Traps, of which the following is a specification.

This invention relates to target traps, and consists in certain improvements in the construction thereof as will be hereinafter fully described and pointed out in the claims.

More particularly this invention relates to target traps wherein a spring actuated arm is used for delivering the target, and in which mechanism is provided for resetting the arm, preferably with the same mechanism that actuates the "pull". The trap is also adapted for throwing known and unknown angles, and is of the same general type as the trap shown in my former patent #956,117, April 26, 1910.

Figure 1 shows a side elevation of the trap, part being in section to better show construction; Fig. 2 a plan view of the trap; Fig. 3 a section through the head of the trap carrying the throwing arm; Fig. 4 a section on the line 4—4 in Fig. 3; Fig. 5 a section on the line 5—5 in Fig. 3; Fig. 6 a fragmentary plan view of the movable frame of the trap and parts thereof; Fig. 7 a section on the line 7—7 in Fig. 6; Fig. 8 a plan view of the trap arm and carrier, the carrier being closed; Fig. 9 a view of the same with the parts shown in open position; Fig. 10 a side elevation of the trap arm and carrier; Fig. 11 a perspective view of the carrier positioning and buffer mechanism; Fig. 12 is an end view of a part of the trap showing the unknown angle mechanism; Fig. 13 a section on the line 13—13 in Fig. 12; Fig. 14 a section on the line 14—14 in Fig. 15; Fig. 15 a section on the line 15—15 in Fig. 12.

1 marks the base of the trap; 2 the front legs of the trap,—two of these being provided; 3 the rear leg of the trap. Arranged at the front of the base is a platform 4 on which is mounted a swivel post 5. A sleeve 6 is journaled on this post, and held in place by a washer 7 and nut 8. The sleeve has the flat face 9 having the arc shaped slot 10. The frame 12 is mounted on this flat portion and is adjustable to vary the angle of the flight of the target. It is mounted on the stud $12^c$ and secured by a nut $12^d$. A bolt $10^a$ extends through the frame and the slot 10, and assists in clamping the frame on the sleeve. These parts are not materially different from those shown in my former application.

The throw arm shaft 13 is journaled in the bearings $12^a$ and $12^b$ at the front end of the frame. The throw arm 14 is carried by this shaft and the carrier 15 is mounted on the end of the throw arm. The shaft 13 is preferably squared (see Fig. 3). The throw arm has a similar squared socket (see Fig. 8) which conforms to the squared end of the shaft and the nut $16^a$ is provided for securing the arm on the shaft. The crank 17 is fixed on the lower end of the shaft preferably extending in the opposite direction radially from the throw arm. It has the crank pin 18 on which is the swiveled eye 19. The throw spring 20 has one end secured to this swiveled eye and the opposite end to the eye bolt 22. A thumb nut 23 is screwed onto the eye bolt 22. It has a sleeve like projection $23^a$ which extends through the perforation 24 in the ear 21 of the frame. The thumb nut is locked in adjustment by means of the set screw 26. By having the set screw extending through the ear 21, the thread on the eye bolt is protected; where the nut is put directly onto the eye bolt, this thread working in the ear 21, becomes damaged.

In order to prevent the backward movement of the throw arm I provide the ratchet disk 28 on the upper edge of the crank. A pawl is slidingly mounted in the socket 30 and is forced into engagement by the spring 31. It will readily be seen that as the arm is rotated, this prevents any backward movement. A pawl plate 32 is fixed on shaft immediately above the bearing $12^a$. It has an ear 33. The pawl 34 is rotatively mounted on this ear by means of the pin 35 and engages a ratchet wheel 36, journaled on the main shaft 13. A spring 37 draws the pawl into engagement and the finger 38 facilitates the removal of the pawl from engagement. A torsional spring 39 is coiled around the shaft 13 and has one end secured to the ratchet wheel 36 and its opposite end secured to a cam plate 41 by a pin 42. A post 43 extends upwardly from the cam plate 41. This has an inwardly extending lip 44 through which the shaft 13 extends. A gear 45 is journaled on the shaft 13 and rests on the lip 44. It is oscillated by the rack 46.

A pawl 47 is pivotally mounted on the under side of the gear, and is spring actuated so that its outer end is pressed outwardly into the path of the post 43. (Spring not shown). A cam 48 is arranged on the top of the cam plate in the path of the latch 49. The latch 49 is carried by a stud 50 extending into the frame 12. The latch extends under the top of the frame and has the upwardly extending finger 51 which is in the path of the throw arm 14.

The operation of the parts so far enumerated is as follows: When the rack 46 is thrown back the gear 45 is rotated carrying the pawl 47 into contact with the post 43 thus driving rotatively the cam plate 41. The spring 39 permits of the initial movement of the cam plate prior to the release of the throw arm. The cam 48 actuates the latch to release the throw arm. The throw arm is driven forward through the influence of the spring 20 on the crank 17, and also through the influence of the energy delivered to the gear 45 and carried to the shaft 13 through the spring 39. When the rack has completed this movement, it will have given the gear 45 a little more than one complete turn, depending upon the lost motion, so that the cam plate 41 will be given one complete turn. The cam plate has the ratchet teeth 52 which are engaged by a pawl 53. The pawl is slidingly mounted in a socket in the frame and pressed forward by a spring 54, so that at the completion of its rotation, the cam plate 41 is locked against a return movement but the gear 45 can readily be turned, the pawl 47 swinging past the post 43 on the return movement. The latch 49 is returned to its normal position by the spring 49$^a$.

The rack 46 is carried by a guide rod 55 mounted on the ears 55$^a$—55$^a$ on the frame. The perforated ears 56 extending upwardly from the rack are mounted on this rod. A spring 57 is secured to one of these uprights 56, and to a block 58, fixed on the rod by the set screw 59. This spring returns the rack as the pull mechanism is returned. The pull chain 60 is attached to the rack, and extends over the pulley 61 (see dotted lines Fig. 1), carried by the sleeve 6, and around a pulley 63 to the arm 67 on the pull connection 64. The chain ends with the eye bolt 65, and is adjustable by the thumb nut 66, and is locked in adjustment. The pull connection has an arm 114 extending in the opposite direction from the arm 67 and the guide rod 115 extends through the arm 114. The guide rod 115 has a stop head at its end which limits the outward movement of the pull rod so as to give just the proper amount of movement to complete a rotation of the cam plate and still not bring the cam 48 into position to trip without resetting. In other words, the length of pull movement is such as to give one rotation with sufficient carrying by to make certain the action of the ratchets and still limit the movement so as to relieve the parts of strain from an overmovement. The pull movement, therefore, is limited by the head on the rod 115 at one end and the base of the trap at the other end, these forming stops for positively limiting the movement. The pulley 61 is carried by a pin 62 (see dotted lines Fig. 1), and this is so set with relation to the stud 12$^c$ as to bring the top of the pulley approximately in line with the center of the stud, so that as the frame is swung, the chain will swing at one of its pivotal connections at the top of the pulley 61, thus obviating the necessity of adjusting the chain with each change of elevation.

In the trap shown in my former application, a spring similar to spring 39 connected the driving mechanism with the shaft, and the driving mechanism wound up this spring as it was unwound in the operation of the trap. In practice it has been found that the operator often carried the throw arm around one revolution, so as to wind up the spring so as to give it greater tension than desired, and on the other hand the operator often also failed to carry the throw arm around a whole revolution, thus changing the tension to such an extent as to prevent the proper driving of the shaft. It is also found in practice that the action of this spring further than to form a yielding connection is unnecessary as the operator of the trap or the one operating the pull, can by pulling the trap, so as to follow the movement of the arm, deliver the proper energy to the shaft to complete the rotation of the arm. All that is necessary therefore is to have a yielding connection between the shaft and the driving mechanism, and it is preferable to limit the movement of this yielding connection so as to give the slight latitude of movement desirable for tripping the latch, and for variations in the speed with which the pull is operated. The collar 69 is fixed on the shaft 13 between the cam plate 41 and the overhanging finger 44. It has the locking finger 70 which engages the extension 71 on the post 43. The extensions are provided to strengthen the lip or finger 44. With this construction, it is impossible for the operator to put the trap out of step. If the arm 14 is swung around in its normal path, and brought against the latch finger 51, the finger 70 coming into engagement with the extension 71 on the post 43 will prevent the unwinding or winding up of the spring 39 except to this limited extent. This slight initial movement, however, will carry the cam 48 in front of the latch 49, so that on the first pull of the trap the latch will not be sprung but the spring 39 will be put under tension. The pawl 53 going into engagement with the cam plate will lock it in its normal position as is usual. On the other hand if the arm is turned in the opposite direction, the same situation will exist. In other words, the shaft and the plate 41 and all the parts with the spring will turn together after the lock finger 71 has come into engagement. After the trap is sprung in its normal operation the pull follows the throw arm as it rotates, the gear 45 thus delivering the necessary energy to throw the target, and to return the arm. It will be observed that the throw spring at the bottom accelerates the arm during the first half of its motion, and retards it during the second half of its motion. The torsion spring simply acts as a yielding connection between the driving connection and the throw arm shaft, the trap depending for its successful operation upon the following through of the pull, so that the gear 45 follows the throw arm with more or less regularity, the spring 39 taking up this little irregularity.

The carrier 15 has the relatively stationary finger 72, and the swinging finger 73, the swinging finger being mounted on the stationary finger by a pin 74. The swinging finger has the post 75 at its outer end and the fixed finger, the rail 76. I showed in my former application, a means for locking the carrier fingers in open position on the delivery of the target. In that construction, a cam or catch was used for this purpose. In practice it was found that the hammering of the finger upon the metal of the catch was so great as to broom up the edge and after a short period be of sufficient extent to interfere with the operation of the parts. Not only that but the short movement of the catch with the pressure on it made it quite difficult to trip the parts with a fragile target. In the present construction, I use a toggle lever formed with the links 77—78. These are connected at their intermediate point by the pin 79. The link 77 is pivoted on the pin 80 extending from the fixed finger and the link 78 is pivoted on the pin 81 extending from the movable finger through the slot 82 in the fixed finger. A spring rod 83 has the hook 84 extending around the post 80 and is secured in place by a coiled spring 85. The rod extends through the post 81. A spring 85 is tensioned by the nut 86, the nut being locked in adjustment by the screw 87. A finger 88 extends from the link 77 into position to contact the post 81 when the links are brought into alinement as is clearly shown in Fig. 9. A post 89 is arranged on the link 77 and the spring 90 extends from this post to post 91 on the stationary finger 72. This spring tends to throw the toggle levers into alinement as shown in Fig. 9, while the spring 85 which forms the tension spring on the carrier, tends to oppose this movement. It will be observed that as the links change their position, the leverages of these two springs vary very rapidly. When the links are brought into alinement the spring 85 exerts no influence in shifting the position of the links, so that the full pressure of the spring 90 is exerted for holding the finger 88 into contact with the post 81 so that the links are held in alinement and the jaws of the carrier thus maintained in an open position. A trip finger 92 is formed on the link 77 and extends forwardly in position to be engaged by the target. As the target is forced into the carrier, this finger is forced back against the pressure of the spring 90. As soon as the links shift out of alinement slightly, the spring 85, being stronger than the spring 90, completes the movement. This mechanism is a decided improvement over the catch in that the surface operating upon the pins to sustain the shock conforms to the surface of the pins so that there is a wide surface contacting to sustain the shock. There is therefore no difficulty as to brooming or injuring the parts as they are operated. Again, in tripping the device, the movement is very light, and after the target is in position and the movement is started, the movement is completed through the action of the carrier spring.

I prefer to provide a supporting slide 72ª formed by bending over a portion of the finger 72 upon itself for the movable finger 73.

In the construction shown in my former application the carrier was mounted on the top of the arm, and buffer and means were arranged at the bottom. In practice it was found that the line of strain being above the point of contact between the arm and the latch, there was a tendency to twist the arm at the moment of contact, and this put a strain on the carrier in a direction transverse to the surface of the plates. In the present construction I have arranged the carrier on the bottom of the arm so that the line of strain is practically in the line of contact between the arm and the latch, thus obviating this tendency. This also improves very materially the positioning and buffer mechanism.

The carrier is secured to the end of the arm by the bolt 93 extending through the carrier and through the end of the arm. A sleeve 94 is pivotally mounted on this bolt, and has a cam surface on its end which rests on the top of the arm. A positioning finger 95 extends forward from the sleeve 94 into the plate 96 extending upwardly from the stationary finger 72. A compression spring 97 is arranged around the bolt 93 and rests on the sleeve 94 and is put under pressure by the nut 98 on the top of the bolt 93. The nut has a projecting finger 99 which serves two purposes. It provides a wrench by means of which the nut may be readily turned to vary the tension of the spring. By adjusting the tension of this spring, the frictional resistance to a turning movement of the carrier of the arm may be varied and this variation in resistance varies the point at which the target will be discharged from the throw arm. By adjusting this spring, therefore, the point of discharge of the target may be so controlled as to bring the line of flight of the target into alinement with the swinging frame. The finger 99 also serves to lock the nut in position in that every time the arm comes in contact with the latch finger 51, this finger acting as a lever on the nut, swings to a position in the direction of the movement of the arm. It therefore attains its adjustment regardless of the direction in which it is moved. I prefer to have the adjusting rod 83 for the carrier with the screw end toward the front of the arm. Where it is reversed, as is shown in my former application, the force of the blow between the arm and the latch tends to bend the rod. By placing it as shown herein, the force of the blow is taken up by tensile strain.

Two cams 100 are arranged on the top of the arm and cams 101 on the cam sleeve 94 conform to the surface of the cam surfaces 100. These are arranged so that the cams 101 will have reached their downward movement when the carrier is in line with the arm. The carrier is then free to swing toward the rear of the arm as the arm is tripped, and when the arm comes in contact with the latch, the carrier through the force of the blow, moves forward carrying the plate 96 and finger 95 with it. This movement is opposed by the friction and pressure of the cams 101—100. As will be seen, this forward movement forces cam 101 upwardly upon the cam 100, thus compressing the spring 97. After the shock has been absorbed by the compression of the spring, the carrier is forced back into line with the arm by the action of the spring on the cam 101. This construction, that is, placing the cams on the top of the arm and extending the bolt up through it, allows ample room for the adjusting of the spring on the top of the bolt, and assists very materially in the assembling of the parts.

I have arranged an unknown angle. This mechanism is substantially that shown in my former application. It sometimes happens that it is desirable to lock the swinging frame so as to throw what is known as "known" angles. This can readily be accomplished with the present construction, because the frame may be locked without throwing out the unknown angle mechanism, the yielding mechanism between the pull and the driving mechanism permitting of the continued movement of the parts. An arm 106 extends from the sleeve 6. It is provided with a perforation through which a pin 107 extends. This pin may be placed in any of the perforations 108 in the base of the post 5. This eventually locks the frame in any angle desired. The link 109 connects the arm with the crank 110. The crank 110 is mounted on the shaft 111 which is journaled in the bearing 111ᵃ in the base. The gear 112 is journaled on the shaft 111 and is actuated by a rack 113. The rack is carried by the arms 114 extending from the pull connection 64. The arm 114 operates upon the guide rod 115 which is secured in the base, and is also guided by the guide bar 116 formed with the rack, and operating upon the bottom of the base, and the ear 117 extending from the side of the rack 3.

A collar 118 is fixed on the bottom of the shaft 111. A spring 110 is secured to the collar by the screw 120 and to a pawl plate 121 by a screw 122. A pawl 123 is mounted on the pawl plate, and is yieldingly forced into engagement with the gear 112 by the spring 123ᵃ. It will readily be seen that as the rack is oscillated, through the action of the pull, the forward movement of the rack drives the gear into position to drive the pawl plate 121 with the pawl locking the gear with the plate, winds up the spring 119 and consequently exerts pressure on the shaft 111 thus yieldingly driving the crank. Of course, if the arm 106 is locked so as to lock the frame for a known angle all that happens is the winding up of the spring and on the return movement of the rack, the spring simply follows the gear as it returns. This yielding connection therefore permits of the locking of the swinging frame without any change whatever in the unknown angle mechanism.

The toothed wheel 124 is fixed on the shaft 111 and is positioned to be connected by the locking pawl 125. A pin 126 is slidingly mounted in the finger 127 extending downwardly from the pawl 125 through the base. A spring 128 yieldingly forces the pin 125 forward. A cam 129 is arranged on the upper surface of the rack. It lifts the pin on the return movement of the rack, so that no movement of the pin is given to the pawl 125. The cam 129 has a cam surface 130 on its forward edge, however, so that on the return movement of the rack, it engages the pin, forces it and the pawl 125 out of engagement with the toothed wheel 124, thus permitting of the shaft 111 and the crank 110 to change the angles on the frame. A hook 131 engages catch 125ᵃ on the pawl 125 in its outer position. The hook 131 is carried by the arm 132, and this arm is pivotally mounted on the pin 133, and extends between the ears 133ᵃ and the base. A spring 134 presses the pawl 125 forward, the spring being tensioned between the pawl 125 and post 135 on the base. A wheel 136 is journaled on the shaft 111, and carries a pawl 137 which engages the teeth 138 on the top of the wheel 124 to drive the wheel 136 forward with the shaft. The wheel 136 has the cam 139 which engages a cam 140 on the arm 141 extending upwardly from the arm 132, the two arms forming a bell crank lever. As the shaft is moved forward, wheel 136 is carried with it until the cam 139 contacts the cam 140. This lifts the hook 131 and permits the pawl 125 to move in and lock the crank against further movement. The wheel 136 then continues and the location of the known angle of the frame is determined by the next point at which the cam 139 comes to rest.

In the operation of the trap, the pull is often delivered so rapidly to the trap that the momentum of the cam or spring plate 41 is such as to carry the cam 48 forward into tripping position so that when the arm 14 returns to the set position, the latch finger 51 will be out of the path of the arm, thus permitting the arm to continue this movement. I have provided mechanism for preventing this. In the present construction, the latch extends through the frame so that the latch finger is at the opposite side of the frame from the cam end of the latch. A locking plate 102 is arranged on the latch and the locking finger 103 is carried by the rack. As the rack is pulled back the finger 103 passes under the plate 102 and in the ordinary timing of the machine this happens while the arm is rotating and prior to the time the cam 48 is in position to trip the latch. The overrunning of the cam 48 of course takes place at the end of the pull so that if there is any such overrunning, it takes place at a time when the locking finger 103 is under the plate 102. The parts are thus locked to prevent the overrunning of the cam plate, and the set position of the latch on the return of the arm is thus assured. This carrying of the latch through the frame not only simplifies this locking mechanism but it also places the end of the throw arm so that the pivot of the carrier is directly over the pivot of the swinging arm. At the same time, the frame is at one side of the post 5, thus allowing the convenient operating of the chain through the post.

In the operation of the trap the throw arm is normally against the latch finger 51. As the pull is operated, the rack 46 operates the gear 45 and this carries with it the cam plate 41. The yielding connection formed by the spring 39 between the cam plate 41 and the shaft 13 permits this forward movement of the cam prior to the following movement of the arm. As soon as the cam plate trips the latch, the arm under the influence of the throw spring on the crank rapidly picks up the throwing movement. The yielding connection between the cam plate and the shaft 13 allows for any unevenness there may be between the rapidity of the pull and the movement of the shaft under the influence of the throw spring. In practice it has been found that only a small amount of relative movement between the cam plate and the shaft 13 is required for this purpose, the pull movement following quite closely the throw movement of the arm. After the arm starts, it continues its movement until it completes its rotation, and is stopped against the latch finger 51. The target is delivered after the arm is moved about 90 degrees from the latch. After the trip has been sprung the arm is carried into contact with the latch finger 51. The limited relative movement between the cam plate 41 and the shaft 13 due to the action of the locking finger 70 retains the spring 39 under tension even though the puller fails to give to the cam plate a full revolution so as to bring the cam plate 41 into a position to be locked by the pawl 53. When, therefore, this happens all that is necessary is to bring the throw arm into contact with the latch finger 51. The cam 48 will then be in front of the latch so that on the next pull of the trap the latch will not be actuated. In consequence, the arm will remain stationary and the cam rotated until brought into position to be locked by the pawl 53. All, therefore, that the operator has to do is to place the throw arm against the latch finger 51 and the puller does the rest, either setting the trap before the proper operation with the first pull or if the trap is in shape for a pull operating the latch and delivering the arm. Upon the return stroke of the pull, the rack 46 returns under the influence of the spring 57, the pawl 47 between the gear 45 and the post 43 allowing the return movement of the gear after actuating the cam plate.

The elevation of the trap can be readily accomplished, the frame being on a line with the top of the pulley 61 so that the changing of elevation swings on one of the links of the chain and does not vary the adjustment of the chain.

As the target is delivered from the carrier, the links of the toggle lever are brought into alinement and the jaws of the carrier are locked in an open position. The spring 90 tends to hold them in alinement while the carrier spring being in alinement with the links of the toggle lever is neutralized. When the target is inserted, it contacts the finger 92, forces the links of the toggle lever out of alinement, and thus the leverage subject to the carrier spring 85 becomes effective and overcoming the force of the spring 90 closes the jaws of the carrier. On the target the two springs 85 and 90 balance each other about midway of the movement of the jaws. After this position is reached, therefore, the carrier spring 85 effects the movement of the finger 92 ahead of the target. In this way the loading of the carrier is much facilitated in that the trip is sprung before the target is in its final position.

The cam surfaces on the end of the arm and on the sleeve 94 cushion the carrier when the throw arm contacts the latch finger 51, both through the compression of the spring 97 and the frictional resistance of the cam surface. These cam surfaces through the action of the spring return the carrier to alinement with the arm so that the target may be readily inserted.

The unknown angle shown in this trap operates in substantially the same manner as the unknown angle mechanism shown in my former Patent #956,117, April 26, 1910.

What I claim as new is:

1. In a target trap the combination of a throw arm; a crank associated with the throw arm; a spring acting on the crank for exerting driving pressure on the arm during its throwing movement; a reciprocating pull mechanism; and a yielding connection between the throw arm and the pull mechanism for resetting the arm; and means for limiting the relative movement between the throw arm and the pull mechanism to less than a revolution of the throw arm.

2. In a target trap, the combination of a throw arm arranged to make a complete revolution at each operation of the trap; a crank associated with the throw arm; a spring operating upon the crank; a reciprocating mechanism for resetting the throw arm; a yielding connection between the throw arm and the pull mechanism; and means for limiting the relative movement between the throw arm and the pull mechanism to less than a revolution of the throw arm.

3. In a target trap the combination of a throw arm a shaft on which the arm is mounted; a crank associated with the throw arm; a spring actuating the throw arm; a reciprocating pull mechanism; a connection between the pull mechanism and the shaft for resetting the throw arm, comprising an element mounted on the shaft and free to oscillate thereon; and a spring connection between the element and the shaft; and means for limiting the movement of the element on the shaft to less than one revolution.

4. In a target trap the combination of a throw arm arranged to make a complete revolution at each operation of the shaft; a shaft on which the throw arm is mounted; a crank associated with the throw arm; a spring operating upon the crank; a reciprocating pull mechanism; a connection between the pull mechanism and the shaft for resetting the throw arm, comprising an element mounted on the shaft, and free to oscillate thereon; and a spring connection between said element and the shaft; and means for limiting the movement of said element relative to the shaft to less than a rotation.

5. In a target trap the combination of a throw arm; a shaft on which the arm is mounted; a crank associated with the throw arm; a spring operating on the crank; a reciprocating pull mechanism; a driving wheel mounted on the shaft and actuated by the pull mechanism; a plate mounted on the shaft and driven by said wheel; a spring connection between the plate and the shaft; and means for limiting the movement of the plate relatively to the shaft to less than one revolution.

6. In a target trap the combination of a throw arm arranged for complete rotation with each operation of the shaft; a shaft on which the throw arm is mounted; a crank associated with the arm; a spring operating upon the crank; an oscillating resetting wheel mounted on the shaft; a pull mechanism connected with said wheel; a plate mounted on the shaft and free to oscillate thereon; a pull connection between the resetting wheel and the plate; a spring connection between the plate and the shaft; and means for limiting the movement of the plate relatively to the shaft to less than one revolution.

7. In a target trap the combination of a throw arm; a shaft on which the arm is mounted; a crank associated with the throw arm; a spring operating on the crank; a reciprocating pull mechanism; a driving wheel mounted on the shaft and actuated by the pull mechanism; a plate mounted on the shaft and driven by said wheel; a spring connected between the plate and the shaft; and means for limiting the movement of the plate relatively to the shaft to less than one rotation, comprising a finger fixed on the shaft and a stop on the plate in the path of the finger.

8. In a target trap the combination of a throw arm adapted to make a complete rotation with each operation of the shaft; a crank associated with the throw arm; a spring operating on the crank; an oscillating resetting wheel carried by the shaft; a plate mounted on the shaft, and having a post thereon; a pawl on the oscillating wheel engaging said post; a finger fixed on the shaft between the resetting wheel and the plate, adapted to engage said post and to limit the movement of the plate relatively to the shaft; and a spring connection between the plate and the shaft.

9. In a target trap the combination of a throw arm adapted to make a complete rotation with each operation of the shaft; a crank associated with the throw arm; a cam plate mounted on the shaft; a spring connection between the plate and the shaft; means for limiting the movement of the plate to less than a rotation relatively to the shaft; devices for exerting pressure on the plate for resetting the throw arm; a trip cam mounted on the plate; and a latch operated by the trip plate, the cam and devices being arranged relatively to each other to carry the crank out of tripping position, except when the spring connection between the plate and the shaft is under tension.

10. In a target trap the combination of a throw arm adapted to make a complete rotation with each operation of the shaft; a crank associated with the throw arm; a plate mounted on the shaft having an upwardly extending post and a lip through which the shaft extends; a collar fixed on the shaft between the lip and plate; a locking finger on the collar for limiting the movement of the plate on the shaft; a spring connection between the plate and shaft; and means for exerting pressure on the plate for resetting the arm.

11. In a target trap the combination of a throw arm adapted to make a complete rotation with each operation of the shaft; a crank associated with the throw arm; a torsion spring mounted on the shaft; a pull mechanism operating upon the shaft through said torsion spring for resetting the arm; and a ratchet mechanism for adjusting the said torsion spring.

12. In a target trap the combination of a throw arm adapted to make a complete rotation with each operation of the shaft; a crank associated with the throw arm; a gear wheel mounted on the shaft; a rack operating upon the gear wheel; a reciprocating pull mechanism connected with the rack; a guide on which the rack travels; an extension spring having one end secured to the guide, and the other to the rack for returning the rack; and a connection between the gear and the shaft.

13. In a target trap the combination of a throw arm arranged to make a complete rotation with each operation; a latch for locking the throw arm in set position; means for tripping the latch; and means for locking the latch in set position to receive the arm.

14. In a target trap the combination of a throw arm arranged to make a complete revolution; a latch against which the throw arm is set; a shaft on which the throw arm is mounted; a cam plate mounted on the shaft; a cam on the plate for tripping the latch; a pull mechanism for resetting the arm; connecting means conveying the movement of the pull mechanism to the plate and from the plate to the shaft; and a locking device actuated by the pull mechanism for locking the latch in set position to receive the arm.

15. In a target trap the combination of a throw arm arranged to make complete rotation with each operation of the trap; a latch for holding the throw arm in set position; a shaft on which the throw arm is mounted; a gear on the shaft; a connection between the gear and the shaft; a rack for operating the gear; a pull mechanism for tripping the latch; and a locking device carried by the rack and adapted to be moved into locking position as the rack is moved to lock the latch in set position to receive the arm.

16. In a target trap the combination of a throw arm adapted to make a complete rotation; a shaft on which the arm is mounted; a frame in which the shaft is journaled; a latch for holding the throw arm in set position, said latch having its locking end at one side of the frame, and having a cam operated end at the opposite side of the frame; a cam actuating said latch; a cam plate on which the cam is mounted; a reciprocating means for actuating the cam plate and a locking device carried by said reciprocating means which is moved into locking position under the latch as the reciprocating means is actuated for locking the latch in set position to receive the arm.

17. In a target trap the combination of an oscillating frame; a shaft journaled in the frame; a throw arm mounted on the shaft; a post on which the frame is mounted, said post being arranged at one side of the frame; a latch for locking the arm with its free end over the axis of the frame; a resetting mechanism comprising a reciprocating member arranged at the same side of the frame as the supporting post; a pull mechanism; and a connection between the resetting mechanism and the pull mechanism extending through the post.

18. In a target trap the combination of a frame; a post on which the throw arm is mounted, and on which the frame swings; a resetting device; a pull mechanism; stops for limiting the pull mechanism to a fixed distance of travel; a flexible connection between the pull mechanism and the resetting device extending through the post; a pulley over which said flexible connection passes; a swinging support for the frame, permitting the adjustment of the elevation of the frame, the apis of the frame being at the level of the top of the pulley to make the axis of the frame as it is elevated co-incident with the flexible connection whereby the adjustment of the flexible connection remains unchanged with a change of elevation of the frame.

19. In a target trap the combination of a throw arm arranged to make a complete rotation with each operation of the trap; a latch for arresting the arm on the completion of its rotation; a carrier pivotally mounted on the arm; and a cam buffer mounted on the top of the arm for cushioning and positioning the carrier after the impact of the arm on the latch.

20. In a target trap the combination of a throw arm arranged to make a complete rotation with each operation of the trap; a latch for arresting the arm on the completion of its rotation; a carrier pivotally mounted on the arm; and a cam buffer mounted on the top of the arm for cushioning and positioning the carrier after the impact of the arm and the latch, said buffer mechanism comprising spiral cams fixed on the arm; a sleeve having spiral cams operating upon the cams on the arm; a connection between the sleeve and the carrier; a spring operating upon the sleeve; and resisting the axial movement thereof through the action of the cams.

21. In a target trap the combination of a throw arm arranged to make a complete rotation with each operation of the trap; a latch for resetting the throw arm arranged for holding the same in set position, adapted to move in a downward direction to release the throw arm; a carrier pivotally mounted on the under side of the arm; a bolt on which the carrier is mounted extending through the arm; spiral cams arranged on the upper side of the arm around the bolt; a sleeve on the bolt; spiral cams on the sleeve in position to operate upon the cams on the arm; a compression spring arranged around the bolt and upon the sleeve; and means on the top of the bolt for securing the spring; and a connection between the carrier and the sleeve.

22. In a target trap the combination of a throw arm arranged to make a complete rotation with each operation of the trap; a latch for resetting the throw arm arranged for holding the same in set position, adapted to move in a downward direction to release the throw arm; a carrier pivotally mounted on the under side of the arm; a bolt on which the carrier is mounted extending through the arm; spiral cams arranged on the upper side of the arm around the bolt; a sleeve on the bolt; spiral cams on the sleeve in position to operate upon the cams on the arm; a compression spring arranged around the bolt and upon the sleeve; a nut on the top of the bolt for securing and adjusting the spring, said nut having a wing at one side for operating the nut and for locking the nut in position; and a connection between the carrier and the sleeve.

23. In a target trap the combination of a throw arm; a carrier pivotally mounted on the throw arm; a bolt forming the pivotal connection between the throw arm and the carrier; a compression spring on the bolt for tensioning the carrier; a nut on the bolt for adjusting the spring, said nut having a wing for adjusting the nut and unbalancing the nut to lock the same in adjustment.

24. In a target trap the combination of a throw arm arranged to make a complete rotation with each operation of the trap; a carrier pivotally mounted on the throw arm; a bolt forming the pivotal connection between the throw arm and the carrier; a compression spring on the bolt for tensioning the carrier; a nut on the bolt for adjusting the spring, said nut having a wing for adjusting the nut and unbalancing the nut to lock the same in adjustment.

25. In a target trap the combination of a carrier having a stationary finger and a movable finger; a toggle lever having one link connected with the stationary finger and the other link with the movable finger for locking the fingers in open position when the links of the toggle lever are in alinement.

26. In a target trap the combination of a carrier having a stationary finger and a movable finger; a toggle lever having one link connected with the stationary finger and the other link with the movable finger for locking the fingers in open position when the links of the toggle lever are in alinement; a spring for exerting a clamping action on the fingers and arranged for exerting pressure to throw the toggle levers out of alinement; and an auxiliary spring operating upon the toggle levers and tending to push them into alinement.

27. In a target trap the combination of a carrier having a stationary finger and a movable finger; a toggle lever having one link connected with the stationary finger and the other link with the movable finger for locking the fingers in open position when the links of the toggle lever are in alinement; a spring for exerting a clamping action on the fingers and arranged for exerting pressure to throw the toggle levers out of alinement; and an auxiliary spring operating upon the toggle levers and tending to move them into alinement; and a stop limiting the action of the auxiliary spring.

28. In a target trap the combination of a carrier having a stationary finger and a movable finger; a toggle lever having one link connected with the stationary finger and the other link with the movable finger for locking the fingers in open position when the links of the toggle lever are in alinement; and a trip finger extending from one link of the toggle lever for tripping the same.

29. In a target trap the combination of a carrier having a stationary finger and a movable finger; a toggle lever having one link connected with the stationary finger and the other link with the movable finger for locking the fingers in open position when the links of the toggle lever are in alinement; and a trip finger extending from one link of the toggle lever into the path of the target as it is inserted in the trap for tripping the toggle lever.

30. In a target trap the combination of a carrier having a stationary finger and a movable finger; a toggle lever having one link connected with the stationary finger and the other link connected with the movable finger for locking the fingers in open position when the links of the toggle lever are in alinement; a spring for exerting a clamping action on the fingers and arranged for exerting pressure to throw the toggle levers out of alinement; an auxiliary spring operating upon the toggle levers and tending to move them into alinement; a stop limiting the action of the auxiliary spring; and a trip finger extending from one of the links of the lever.

31. In a target trap the combination of a carrier having a stationary finger and a movable finger; a toggle lever having one link connected with the stationary finger and the other link connected with the movable finger for locking the fingers in open position when the links of the toggle lever are in alinement; a spring for exerting a clamping action on the fingers and arranged for exerting pressure to throw the toggle levers out of alinement; an auxiliary spring operating upon the toggle levers and tending to move them into alinement; a stop limiting the action of the auxiliary spring; and a trip finger extending from one of the links of the lever into the path of a target being placed in the carrier.

32. In a target trap the combination of an oscillating frame carrying the throwing device; unknown angle mechanism for oscillating said frame; a reciprocating pull mechanism; a yielding connection between said pull mechanism and the unknown angle mechanism; and means for locking the frame for known angles, the yielding connection permitting the movement of the pull mechanism after the locking of the frame.

33. In a target trap the combination of a throw arm; a crank associated with the throw arm; a throw spring secured to the crank for operating the throw arm; a frame in which the throw arm is journaled, and having a perforation therein for receiving an adjusting screw for the spring, an adjusting screw for the spring extending through said perforation; and an adjusting nut for the spring having a sleeve extending into the perforation.

In testimony whereof I have hereunto set my hand in the presence of two subscribing witnesses.

HUGH C. LORD.

Witnesses:
 MILES B. KITTS,
 MARGARET BEIGLE.